United States Patent [19]

Ohsawa et al.

[11] Patent Number: 5,745,971
[45] Date of Patent: May 5, 1998

[54] METHOD OF MANUFACTURING A PULP MOLDING DIE

[75] Inventors: Okimasa Ohsawa, Kashiwa; Kuniaki Osada, Yokohama; Nobuyoshi Okato; Tatsuo Katagiri, both of Kawasaki, all of Japan

[73] Assignees: Nippon Paper Industries Co., Ltd.; Nippon Yakin Kogyo Co., Ltd., both of Tokyo, Japan

[21] Appl. No.: 629,084

[22] Filed: Apr. 8, 1996

Related U.S. Application Data

[62] Division of Ser. No. 265,826, Jun. 27, 1994, abandoned.

[30] Foreign Application Priority Data

Jul. 14, 1993 [JP] Japan .................... 5-174394

[51] Int. Cl.⁶ .................... B23P 17/04; B29C 49/06; B21D 15/10
[52] U.S. Cl. .................... 29/421.1; 29/896.6; 264/510; 72/60
[58] Field of Search .................... 29/896.6, 421.1, 29/423; 264/510, 511, 512, 544 B, 571, 219 B, 86, 87; 72/60

[56] References Cited

U.S. PATENT DOCUMENTS 3,001,582  9/1961  Kindseth et al.
3,325,349  6/1967  Reifers.
4,901,552  2/1990  Ginty et al. ............... 29/421.1
5,309,747  5/1994  Yasui ........................... 72/60
5,361,617  11/1994 Dittlo ........................... 29/421.1
5,407,610  4/1995  Kohama et al. ............ 264/510
5,540,075  7/1996  Hall, Jr. ....................... 72/60

FOREIGN PATENT DOCUMENTS 52-63268  5/1977  Japan.
58-32556  7/1983  Japan.
2-40800   9/1990  Japan.

OTHER PUBLICATIONS

English-Language abstract of Japanese Patent No. 52-63268.
English-Language abstract of Japanese Patent No. 2-40800.
English-Language abstract of Japanese Patent No. 58-32556.

*Primary Examiner*—S. Thomas Hughes
*Assistant Examiner*—Tisa Stewart
*Attorney, Agent, or Firm*—Oliff & Berridge, PLC

[57] ABSTRACT

A method of manufacturing a pulp molding die, by providing a superplastic material plate having a plurality of preformed through-holes, closing the plurality of preformed through-holes, heating the superplastic material plate under a pressurized atmosphere, forming the plate into a desired shape, and uncovering the plurality of preformed through-holes of the plate, thereby forming the pulp molding die.

10 Claims, 5 Drawing Sheets

METHOD OF MANUFACTURING A PULP MOLDING DIE

This is a Division of application Ser. No. 08/265,826 filed Jun. 27, 1994, now abandoned.

BACKGROUND OF THE INVENTION

1. Field of the Invention

The present invention relates to a die for molding pulp products, e.g., a packing material or the like, and a manufacturing method therefor, and a molding pulp product and a manufacturing method therefor.

2. Description of Related Art

Molding pulp products may be classified into 2 types, soft molding products and hard molding products, according to the manufacturing method therefor.

(a) Soft Molding Products

Generally, soft molding products are used as a packing material for eggs, vegetables and fruits, industrial goods and the like, and have a thickness of 1.5 mm to 3.0 mm. The importance of molded products formed by a pulp molding method in which used paper are utilized as a main raw material, is on the rise in comparison with a conventional cushion material made of foamed plastics, from a viewpoint of reuse of waste products.

In the manufacture of molded products formed by such a pulp molding method (soft molding), raw material diluted with water which includes dissolved used paper, i.e., water slurry of pulp, is supplied into a vessel. A mold assembly which comprises a metal molding die with a plurality of through holes for suction and a metal screen covered on the metal molding die, is immersed into the diluted raw material. The metal molding die is made of aluminum, gun metal or the like. Thereafter, vacuum-absorption and dewatering are carried out through the through holes for suction of the molding die from the inner side of the die assembly, so that pulp fibers in the raw material are deposited on the metal screen. Accordingly, a molding pulp product including water is obtained. The molding pulp product is taken out from the mold assembly and dried, and thus a finished product is obtained. The shape of the product may be adjusted by a press, if necessary.

(b) Hard Molding Products

Generally, hard molding products, which called "Tex", are used as a packing material, a cushion material, or a fixing material, for heavy goods, e.g., motors, car parts, household electric appliances, toilet stools and the like, and have a thickness of 10 mm to 15 mm. The manufacturing method for hard molding products is different from that of the soft molding products as follows. The manufacturing method for the hard molding products (hard molding) comprises the steps of: providing a pair of molding dies vertically in a vessel, each of which has a construction similar to the die for soft molding products; supplying a diluted suspension of raw material which has a concentration higher than that of the soft molding, between the pair of dies, and pressing to dewater the suspension by the pair of dies, so that pulp fibers in the raw material are deposited on a metal screen provided on each die. Next, the molding pulp product is taken out from the upper surface of the die assembly and dried, and thus a finished product is obtained, similarly to that of the method of soft molding.

Figure 5:
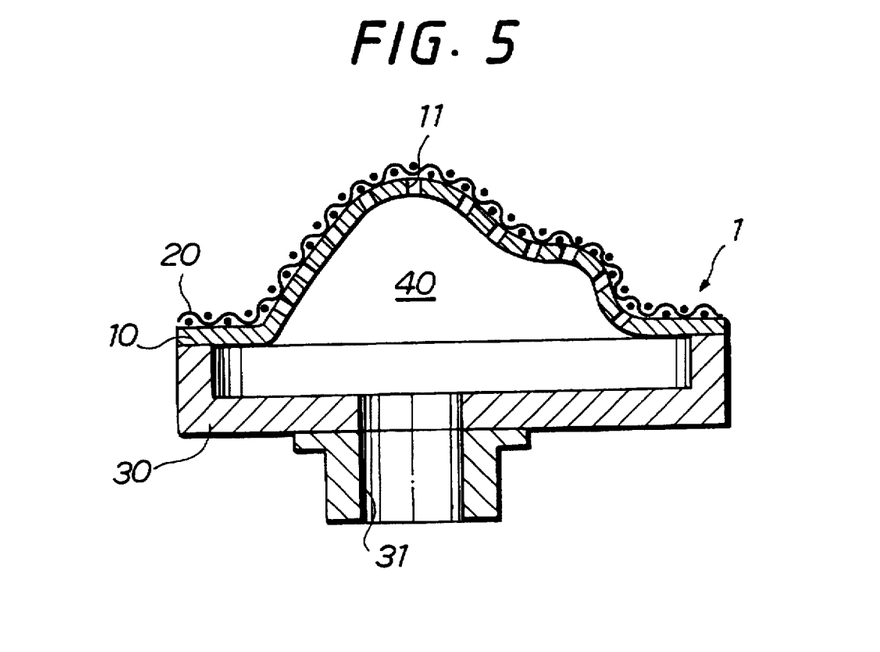
FIG. 5 is a vertically cross-sectional view of a conventional pulp molding die.

A conventional die assembly 1 for pulp products comprises a construction as shown in FIG. 5. That is, the die assembly 1 comprises a die body 10 for determining the shape of a pulp product, and a screen 20 provided closely on the surface of the die body 10. The rear peripheral surface of the die body 10 is mounted to a pedestal 30. The pedestal 30 and the die body 10 form a plenum 40 inside thereof. The pedestal 30 has an evacuation opening 31 for evacuating air from the plenum 40 by vacuum-absorption.

Figure 6:
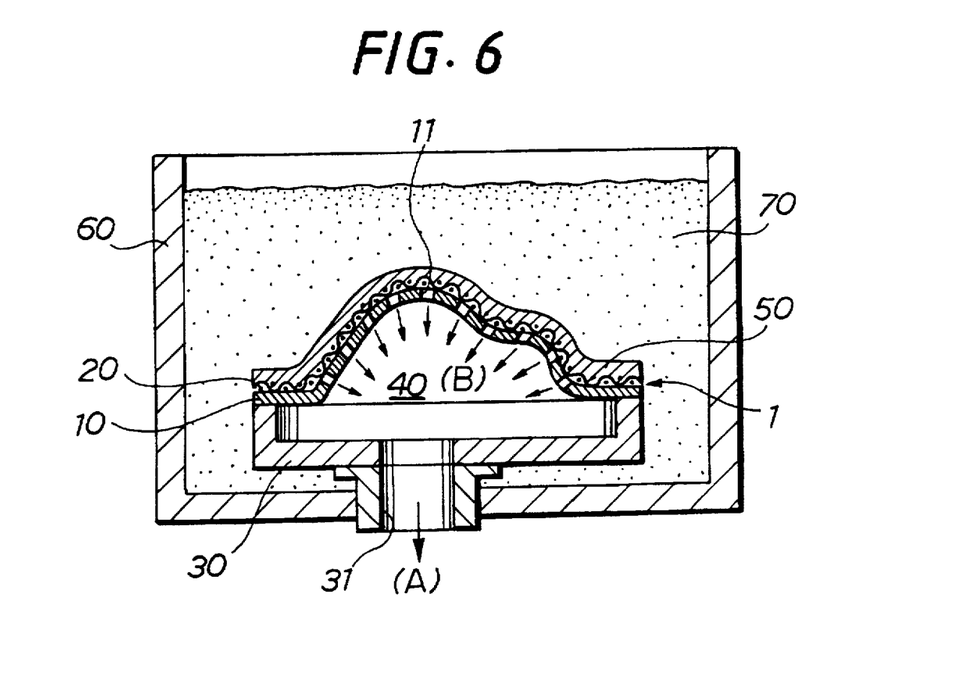
FIG. 6 is a view for explaining a method for molding a pulp product by using the conventional pulp molding die as shown in FIG. 5.

FIG. 6 illustrates a manufacturing state of a molding pulp product. The die body 10 with the metal screen 20 thereon is immersed into a diluted suspension 70 of raw material in a vessel 60. Thereafter, pulp fibers in the raw material are deposited on the metal screen 20 to form a molding pulp product 50, by vacuum-absorption as indicated by arrows (A) and (B), or pressing to dewater the suspension of pulp fibers by a pair of dies which are provided to sandwich the suspension vertically. The molding pulp product 50 is taken out from the screen 20 and dried, and thus a finished product is obtained.

As described above, manufacture of the die body 10 requires cutting a metal casting, e.g., of aluminum, of gun metal or the like, and opening a plurality of through holes 11 for suction in the die body 10 by a drill or the like. Thereafter, the surface of the die body 10 covered with the screen 20 of a 40 to 80 mesh size is required.

Since the shape of the molding pulp product is generally complex, it is often difficult to form a plurality of through holes for suction in the die having a complex shape. Further, by such a complex shape of the die, it is often impossible to provide the screen 20 on the die closely. In such a case, a plurality of small metal castings each of which has a small screen 20 thereon are produced, and a plurality of through holes are formed in each metal casting. Then, these metal castings having screens thereon are combined to one another, so that a complete pulp molding die 1 is formed.

Work for attachment of the screen 20 on the die after drilling is a manual function which requires a great deal of skill. Such a screen 20 is often destroyed by a lot of repeated suction or applied pressure. Work for repairing the screen requires much time. It is preferable to use a kind of stainless steel which has a high corrosion resistance and a high strength as a material of the screen 20. However, stainless steel has a problem of inferior workability. In order to fix the stainless steel screen to the die body 10, fine wires for binding these from the rear side of the die body 10 and the like are required, and such a work needs much time.

As described above, the complicated steps for manufacturing the pulp molding die 1 require not only a higher manufacturing costs but much time for manufacture. For such a pulp molding die 1 having a plurality of through holes, a copper-alloy casting is often adopted. It is difficult to replace the molding die 1 with another because of the heavy weight of the copper-alloy casting.

A pulp molding die comprising a sintered body of metal powder or a solidified body of ceramic powder, which have a large number of minute holes therein, has been developed as a special pulp molding die which requires no screen. Since almost the minute holes are not straight inside of the molding die, these holes are easy to be clogged with fibers of raw material. Consequently, it is difficult to operate the pulp molding die continuously. Such a molding die has been used only for a sample, or a trial product at present.

As described above, conventional pulp molding dies have a lot of problems with respect to the manufacturing costs, the delivery time, the requirement of skill to a worker attaching a screen, the maintenance of the screen 20 and the like. According to the conventional dies, it is difficult to supply molding pulp products in a short delivery time and at low cost. This is one of the reason that the development speed of the molding pulp products which are recyclable products using used paper as main raw material, is getting dull in the packing industry which is highlighted in view of the protection of environment. When such a pulp molding die 1 is used, a print of the metal screen 20 is formed on the surface of the molding pulp products. Therefore, the condition of the surface of the obtained molding pulp product was not good.

SUMMARY OF THE INVENTION

The present invention was developed in view of the above-described problem. An object of the present invention is to provide a lightweight pulp molding die which requires no screen attachment work by a skilled worker, can supply molding pulp products in a short period of time, can simplify maintenance itself and improve the work efficiency; and to provide a manufacturing method therefor.

Another object of the present invention is to provide a molding pulp product having a smooth surface by using the pulp molding die which has the above described advantages, and to provide a manufacturing method therefor.

In order to achieve the above-mentioned objects of the present invention, the inventors found that adsorption of pulp fibers on the pulp molding die in a suspension can be continuously carried out without clogging, even if no screen is provided. The inventors made progress in their studies and then have made the present invention. Formation of a container or a cushion material for packing goods having irregular shapes such as vegetables and fruits requires a pulp molding die having a complex shape. It is found that formation of such a complex shape is easily possible by superplastically deforming a superplastic material. In particular, use of a stainless steel as such a superplastic material provides a high corrosion resistance and a high strength.

The present invention has been made on the basis of the above described knowledge. Therefore, in accordance with one aspect of the present invention, the pulp molding die comprises a plate with a plurality of linear through holes having an approximately constant and uniform diameter which is not more than 2.0 mm, over the front surface to the rear surface, wherein the plurality of linear through holes are formed at a pitch which is not less than 0.05 mm and not more than 2.0 mm, and the ratio of the opening area of the linear through holes to the apparent area of the front or rear surface of the plate is not less than 8.8% and not more than 75%. Preferably, the diameter of the through holes is not less than 0.05 mm and not more than 2.0 mm. The plate may comprise a plurality of plate pieces which are combined to one another in a body, each of the plate pieces having a plurality of linear through holes. Further, the plate may be a superplastic material plate which was superplastically deformed.

The reason why the diameter of the through holes formed in the pulp molding die is not more than 2.0 mm is that, when the diameter is more than the upper limit, pulp fibers in the suspension pass through the through holes, so that it is difficult to obtain molding pulp products having a uniform and sufficient strength. Definition of the lower limit of the diameter of the through holes is not required in particular. However, in order to obtain a suction force sufficient to form a molded product having a thickness satisfactory on strength, at a proper molding speed, the diameter of the through holes is preferably not less than 0.05 mm.

The reason why the pitch of the through holes is not less than 0.05 mm and not more than 2.0 mm is that, when the pitch is more than the upper limit, pulp fibers adsorbed on the molding die cannot be twined with one another, so that it is difficult to form a molding pulp product; and when the pitch is less than the lower limit, the strength of the pulp molding die is too low to put the die to practical use.

The reason why the ratio of the opening area of the linear through holes to the apparent area of the front or rear surface of the plate (hereinafter, referred to rate of hole area) is not less than 8.8% and not more than 75% is as follows. The maximum rate of hole area is obtained when the through holes have the maximum diameter of 2.0 mm and the minimum pitch of the through holes is 0.05 mm. On this case, the maximum rate of hole area is 75%. On the other hand, in order stably to mold pulp products, it is necessary that pitch of the through holes is not more than three times diameter thereof. When the pitch of the through holes is not more than three times diameter thereof, the rate of hole area is 8.8%.

The above-described apparent area means the total of the area of the exposed portion of the molding die, i.e., of the substantial portion between the holes of the pulp molding die, plus the area of the opening portions of the through holes, i.e., of no existing portions because of being holes.

In order to manufacture a pulp molding die having through holes with the above-mentioned diameter and pitch, a plurality of plate pieces having a proper size are prepared. A plurality of through holes are previously formed on each plate piece by a well-known drilling, e.g., punching, laser beam machining, electron beam machining or the like. These plate pieces are combined to one another in a body by welding or the like. The welding forms weld lines between the combined plate pieces of the die. Formation of such weld lines is not a problem, unless the width of the weld bead is larger than the ordinary one, and so far as the weld bead is partial. The connection between these plate pieces may be carried out not only by welding but also by another means, e.g., by using an adhesive material, as much as a practically enough strength can be obtained.

In accordance with another aspect of the present invention, the method for manufacturing a pulp molding die comprising a plate with a plurality of linear through holes having an approximately constant and uniform diameter which is not more than 2.0 mm, over the front surface to the rear surface, wherein the plurality of linear through holes are formed at a pitch which is not less than 0.05 mm and not more than 2.0 mm, and the ratio of the opening area of the linear through holes to the apparent area of the front or rear surface of the plate is not less than 8.8% and not more than 75%; comprises the steps of: placing a first superplastic material plate which has a plurality of linear through holes, on a forming die having a cavity which has a shape complementary to that of the pulp molding die to be formed; placing a second superplastic material plate which has no through hole, on the first superplastic material plate to close the linear through holes of the first plate; and applying a forming pressure on the second superplastic material plate from the above so as superplastically to deform the first and second plates, and thereby the first plate is pressed on the cavity of the forming die to form the shape of said pulp molding die.

The manufacture of the pulp molding die by a superplastic forming is carried out by placing a second superplastic material plate having no through hole on the first superplastic material plate having a plurality of through holes therein previously. Although a forming method for manufacturing the pulp molding die is not limited, the gas blow forming method utilizing a gas pressure for forming is preferable.

The reason why the second superplastic material plate is placed on the first superplastic material plate is as follows.

If the gas blow forming method is carried out by using only the first superplastic material plate, without placing the second superplastic material plate thereon, gases for applying a forming pressure escape through the through holes, so that the gas pressure cannot be effectively applied to the first superplastic material plate. Therefore, it is necessary to close the through holes by the second superplastic material plate. It is necessary that the through holes are closed by the second superplastic material plate until the deformation of the first superplastic material plate is finished. Therefore, the second plate is also required to comprise a superplastic material.

It is possible to fix both the periphery of the overlapped first and second superplastic material plates to the forming die. It is also possible to fix only the periphery of the second superplastic material plate to the forming die so that the first superplastic material plate is independent of such fixing. When the first superplastic material plate is not fixed, the second superplastic material plate is deformed by the applied gas pressure. Deformation of the second superplastic material plate is transferred to the first superplastic material plate. Consequently, the first superplastic material plate is pressed onto the forming die, so that a pulp molding die of the first superplastic material plate is formed. During the forming, the air or the like is evacuated from the cavity of the forming dies. It is preferable previously to replace the air by an inert gas, in order to prevent oxidation of the first superplastic material plate and to obtain a pulp molding die having a good surface condition. After such a superplastic forming, the surface of the formed pulp molding die may be cleaned by using an acid or by a mechanical grinding, in order to remove oxidized scales formed on the pulp molding die.

In accordance with another aspect of the present invention, the pulp product is molded by using the above described pulp molding die, and the surface of the pulp product which was in contact with the molding die is smooth.

In accordance with another aspect of the present invention, the method for manufacturing a pulp product comprises the steps of: immersing the above described pulp molding die into a suspension of pulp fibers; and thereafter, applying a vacuum absorption to the inside of the pulp molding die, and thereby a pulp product with smooth surfaces which are in contact with the pulp molding die is molded on the molding die.

In accordance with another aspect of the present invention, the method for manufacturing a pulp product comprises the steps of: immersing the above described pulp molding die into a suspension of pulp fibers; and thereafter, pressing to dewater the suspension of pulp fibers by a pair of pulp molding dies which are provided to sandwich the suspension vertically or horizontally, and thereby a pulp product with smooth surfaces which are in contact with the pair of pulp molding dies is molded on the molding dies.

According to the invention, it is possible to use a plate having a plurality of through holes as a pulp molding die without a screen. Therefore, it is possible to provide a lightweight and maintenance-free pulp molding die, which has no screen, for molding pulp products which can overcome problems of conventional pulp molding die. Furthermore, it is possible to shorten the delivery time for the molding die, to reduce the production costs therefor, and to improve the corrosion resistance thereof. The state of the surface of the molding pulp product which is formed by using such a molding die is smooth because the molding die has no screen.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Hereinafter, the feature of the present invention will become apparent in the detailed description of the embodiments. In the specification and the attached drawings, the same numerals are given to the parts which have the same construction.

Figure 1:
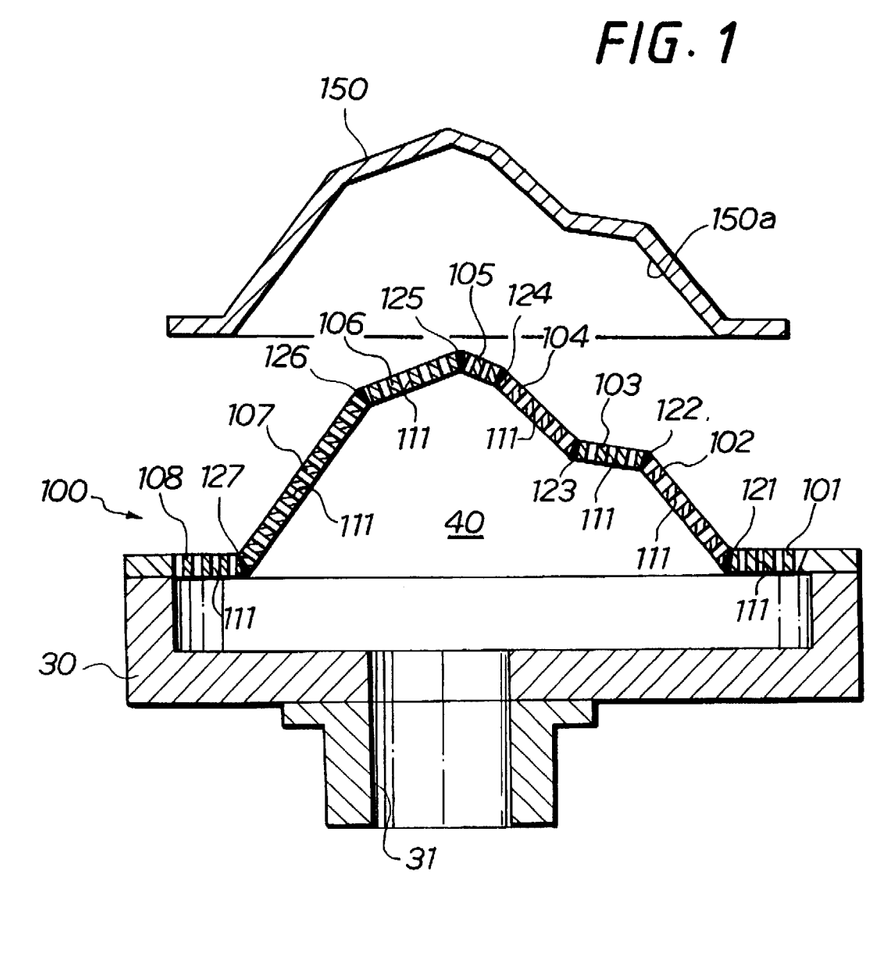
FIG. 1 is a vertically cross-sectional view of a pulp molding die according to the first embodiment of the present invention and a molding pulp product molded by using the molding die.

FIG. 1 is a vertically cross-sectional view of a pulp molding die according to the first embodiment of the present invention and a molding pulp product formed by using the molding die. As shown in this Figure, the pulp molding die 100 comprises plate pieces 101, 102, 103, 104, 105, 106, 107 and 108 which are combined to one another as a body by welding. Each plate piece has a plurality of through holes 111. In this embodiment, 8 plate pieces are shown. However, the number of the plate pieces is not limited. The pulp molding die 100 is mounted on a pedestal 30 and is used in that state, similarly to the conventional pulp molding die.

In this Figure, reference numerals 121, 122, 123, 124, 125, 126, and 127 denote weld lines. The reference numeral 31 denotes an evacuation opening which is communicated with a vacuum pump when the plenum 40 is drawn in by vacuum suction in a suspension.

The pulp molding die 100 having the above described construction is manufactured as follows.

The plate pieces 101, 102, 103, 104, 105, 106, 107 and 108, each of which comprises a stainless steel of SUS 304, and has a proper size, a thickness of 2.0 mm, a proof stress of 250 N/mm$^2$, and a strength of 600 N/mm$^2$, are prepared. A plurality of linear through holes 111 are formed in each of the plate pieces 101, 102, 103, 104, 105, 106, 107 and 108 by using electron beam or the like. These through holes have an approximately constant and uniform diameter which is not more than 2.0 mm, over the front surface to the rear surface. These linear through holes are formed at a pitch which is not less than 0.05 mm and not more than 2.0 mm. The ratio of the opening area of the linear through holes to the apparent area of the front or rear surface of the plate is not less than 8.8% and not more than 75%. Thereafter, these plate pieces 101, 102, 103, 104, 105, 106, 107 and 108 are combined to one another as a body by welding, adhesion or the like.

An embodiment of the pulp molding die 100 which is practically obtained by the above-mentioned manufacturing method will be explained to clarify the effectiveness thereof, as follows.

In this embodiment, a plurality of linear through holes 111 having a diameter of about 0.3 mm were formed in the plate pieces 101, 102, 103, 104, 105, 106, 107 and 108, at a pitch of about 0.5 mm so that the through holes are provided in rows in staggered fashion at an angle of approximately 60° to each other, in a plan view. The ratio of hole area of the pulp molding die 100 was about 32%.

The pulp molding die was mounted to a molding machine and molding was carried out by steps and under a condition similar to those of the conventional process. As a result, molding pulp products 150 having a thickness of about 2.2 mm and a smooth flat surface were obtained. It was ascertained that a pulp molding can be carried out by using the pulp molding die 100 of the first embodiment without problem. The surface 150a of the molding pulp product 150 which had been in contact with the pulp molding die 100 was smooth in comparison with a conventional product.

Comparative results between the pulp molding die of the first embodiment and a conventional pulp molding die made of bronze shown in FIG. 5 are set forth in Table 1. In this Table, the numerals for Conventional Example in the spaces of Production Cost and Time of Delivery indicate the production costs and the time of delivery necessary to manufacture a conventional pulp molding die respectively, when the production costs and the time of delivery necessary to manufacture the pulp molding die 100 of the first embodiment are 1 and 1 respectively. It is often necessary to prepare a plurality of pulp molding dies 100 when molding pulp products 150 are practically mass-produced. In order to compare the first embodiment and the conventional Example, 6 molding dies according to the first embodiment and 6 molding dies according to the conventional example were manufactured and compared.

according to the first embodiment requires no maintenance because of no screen. Furthermore, it is found that the molding die according to the first embodiment is excellent with respect to both the production costs and necessary time for delivery. The strength of the molding die according to the first embodiment is not less than that of the molding die according to the conventional example.

Figure 2:
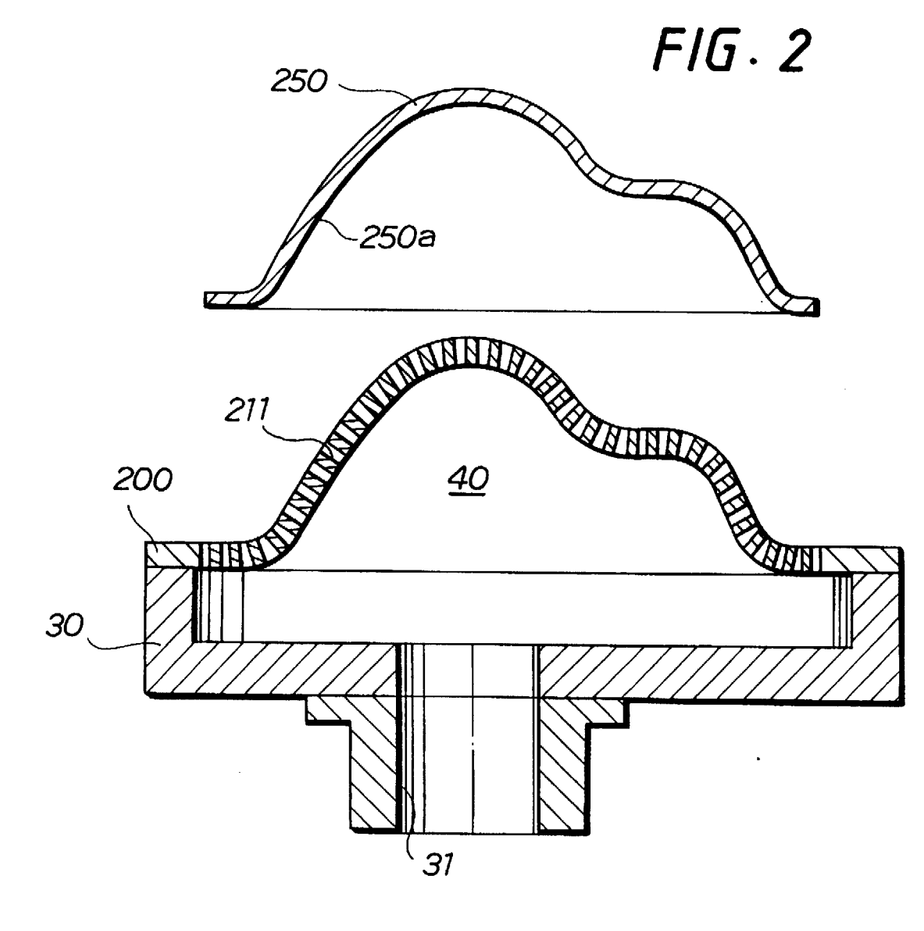
FIG. 2 is a vertically cross-sectional view of a pulp molding die according to the second embodiment of the present invention and a molding pulp product molded by using the molding die.

FIG. 2 is a vertically cross-sectional view of a pulp molding die according to the second embodiment of the present invention and a molding pulp product formed by using the molding die. The explanation of the parts of the second embodiment similar to those of the first embodiment is omitted.

As shown in this Figure, a pulp molding die 200 for forming pulp products has a plurality of linear through holes 211 and comprises a superplastic material plate which was superplastically deformed. The pulp molding die 200 is mounted on a pedestal 30 and is used in that state, similarly to the pulp molding die of the first embodiment. According to the molding technique utilizing superplasticity, it is possible to form a complicated shape which cannot be formed by an ordinary deep drawing processing. The superplastic forming technique has an effect on manufacture of a die for molding a container or a cushion material for packing goods having irregular shapes such as vegetables and fruits.

The pulp molding die 200 having the above described construction is manufactured, as follows.

Figure 3:
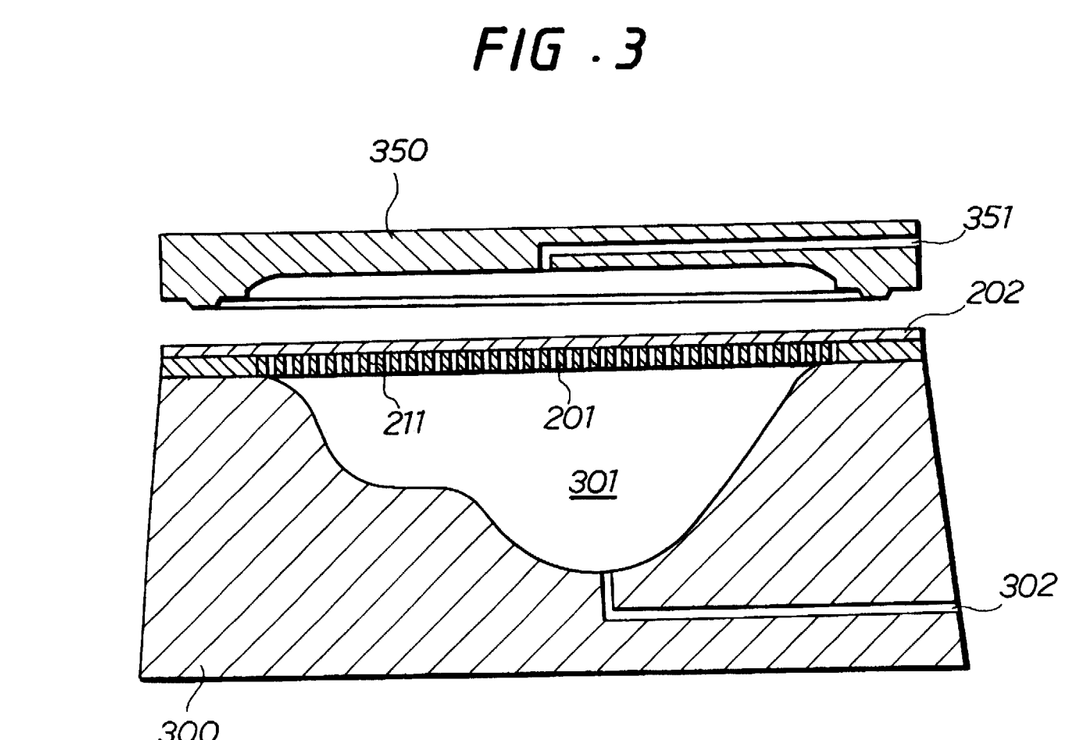
FIG. 3 is a view for explaining a manufacturing method of the pulp molding die according to the second embodiment, and illustrates a state of the molding die in which a superplastic material plate is placed on a forming die, before forming.

The superplastic material plate 201 which comprises a duplex stainless steel of SUS 329J1L, and has a thickness of 2.0 mm, a proof stress of 552 N/mm$^2$, and a strength of 724 N/mm$^2$, are prepared, as shown in FIG. 3. A plurality of linear through holes 211 are formed in the superplastic material plate 201 by using electron beam or the like. These through holes have an approximately constant and uniform diameter which is not more than 2.0 mm, over the front surface to the rear surface. These linear through holes are formed at a pitch which is not less than 0.05 mm and not more than 2.0 mm. The ratio of the opening area of the linear through holes to the apparent area of the front or rear surface of the plate is not less than 8.8% and not more than 75%. The above-mentioned condition with respect to the through holes 211 may be satisfied after the superplastic forming.

Then, a second superplastic material plate 202 which has no through hole is laid on the first superplastic material plate 201, as shown in FIG. 3. The second superplastic material plate 202 has a proper thickness, e.g., 0.5 mm. These first and second superplastic material plates 201 and 202 are placed on a forming die 300 having a cavity which has a predetermined shape, i.e., a shape complementary to that of

TABLE 1

|  | THICKNESS OF DIE | WEIGHT | STATE OF SCREEN | PRODUCTION COST | TIME FOR DELIVERY |
| --- | --- | --- | --- | --- | --- |
| FIRST EMBODIMENT | 2.0 mm | 4.2 kg | *NO SCREEN | 1 | 1 |
| CONVENTIONAL EXAMPLE | 3.8 mm | 9.1 kg | DAMAGED | 6 | 4 |

*MAINTENANCE FOR A SCREEN IS NOT REQUIRED BECAUSE OF NO SCREEN.

The results in the Table show that the thickness and the weight of the pulp molding die according to the first embodiment of the present invention are about half and not more than half, of those of the pulp molding die according to the conventional example, respectively. The molding die the pulp molding die to be formed. Further, a covering body 350 for closing up is placed thereon to apply a load to the first and second superplastic material plates 201 and 202. It is a matter of course that the forming die 300 is previously heated to set to a temperature, e.g., 926° C., at which superplasticity is revealed.

Figure 4:
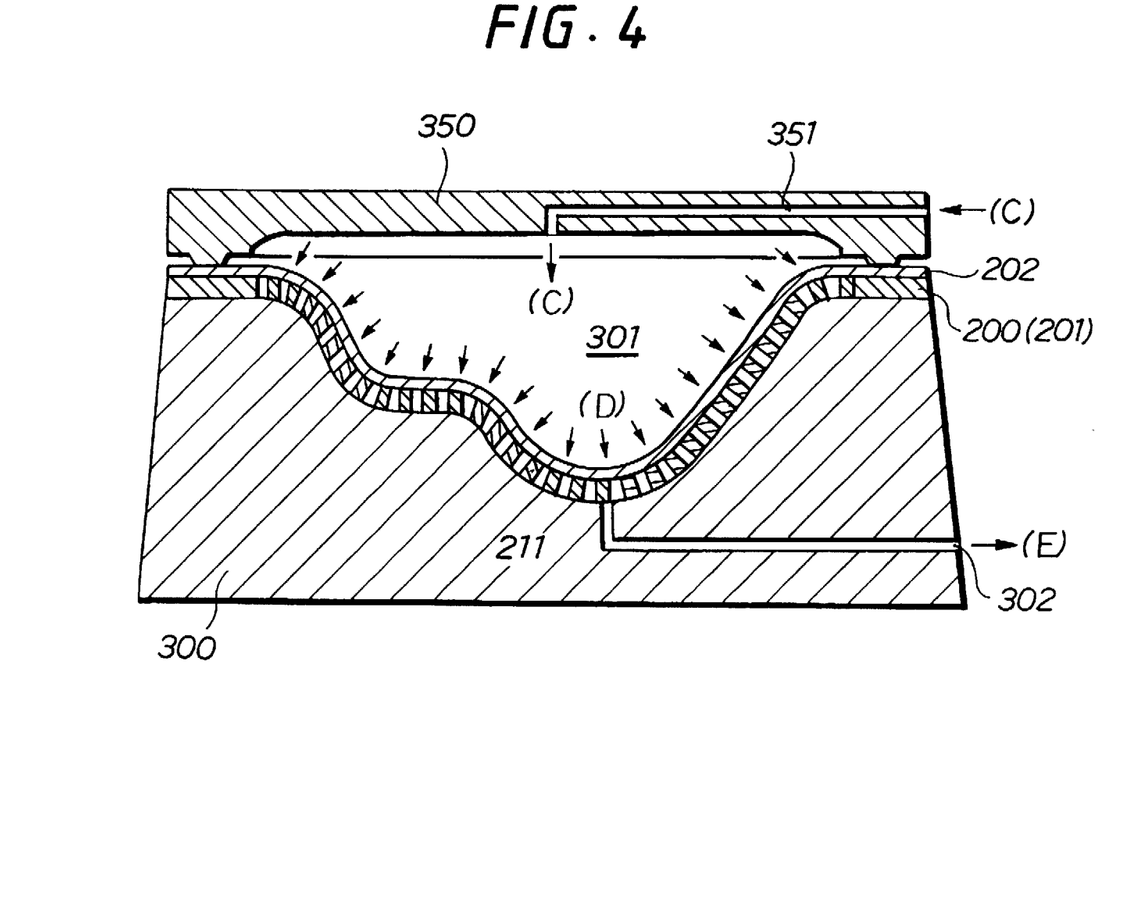
FIG. 4 is a view for explaining a manufacturing method of the pulp molding die according to the second embodiment, and illustrates a state of the molding die in which a superplastic material plate is placed on the forming die, after forming.

Thereafter, as shown in FIG. 4, an inert gas, e.g., argon gas, which is indicated by an arrow (C), having the maximum pressure of 27 kg/cm² is introduced into the cavity 301 of the forming die 300 through a pipe 351 for supplying gas which is provided in the covering body 350, while maintaining the above-mentioned temperature. Gas pressure is applied to the surface of the second superplastic material plates 202, which is indicated by an arrow (D), and thereby the first and second superplastic material plates 201 and 202 are superplastically deformed. The gas in the cavity 301 of the forming die 300 is evacuated to the outside of the die through an evacuation pipe 302, which is indicated by an arrow (E). The pressure in the cavity 301 may be reduced before or during the forming, if necessary. The inside of the cavity 301 may also be in an inert gas atmosphere.

After the forming, the first and second superplastic material plates 201 and 202 are removed from the forming die 300, and the first and second superplastic material plates 201 and 202 are separated to each other. Accordingly, it is possible to obtain the pulp molding die 200 for molding pulp products.

An embodiment of the pulp molding die 200 which is practically obtained by the above-mentioned manufacturing method will be explained to clarify the effectiveness thereof, as follows.

In this embodiment, a plurality of linear through holes 211 having a diameter of about 0.3 mm were formed in the first superplastic material plates 201, at a pitch of about 0.6 mm so that the through holes are provided in rows in staggered fashion at an angle of approximately 60° to each other, in a plan view. The ratio of hole area of the first superplastic material plates 201 prior to the superplastic forming was about 23% and the average ratio of hole area after the forming was about 27%.

The pulp molding die was mounted to a molding machine and a pulp molding for forming pulp products was carried out by steps and under a condition similar to those of the conventional process. As a result, molding pulp products 250 having a thickness of about 2.8 mm and a smooth curved surface were obtained, as shown in FIG. 2. It was ascertained that a pulp molding can be carried out by using the pulp molding die 200 of the second Embodiment without problem. The surface 250a of the molding pulp product 250 which had been in contact with the pulp molding die 200 was smooth in comparison with that of a conventional product.

Comparative results between the pulp molding die of the second embodiment and a conventional pulp molding die made of bronze shown in FIG. 5 are set forth in Table 2. In this Table, the meaning of the numerals in the spaces of Production Cost and Time of Delivery is the same as that of Table 1 in the first embodiment.

The results in the Table 2 show that the thickness and weight of the pulp molding die according to the second Embodiment of the present invention are about half and not more than half, of those of the pulp molding die according to the conventional Example, respectively. The pulp molding die according to the second Embodiment requires no maintenance because of no screen. Furthermore, it is found that the pulp molding die according to the second Embodiment is excellent with respect to both the production costs and necessary time for delivery. The strength of the molding die according to the second embodiment is not less than that of the molding die according to the conventional example.

TABLE 2

|  | THICKNESS OF DIE | WEIGHT | STATE OF SCREEN | PRODUCTION COST | TIME FOR DELIVERY |
| --- | --- | --- | --- | --- | --- |
| SECOND EMBODIMENT | 2.0 mm | 4.0 kg | *NO SCREEN | 1 | 1 |
| CONVENTIONAL EXAMPLE | 3.8 mm | 9.1 kg | DAMAGED | 3 | 1.5 |

*MAINTENANCE FOR A SCREEN IS NOT REQUIRED BECAUSE OF NO SCREEN.

It is a matter of course that quality of material, a thickness, a proof stress, and a strength or the like of the plate pieces 101, 102, 103, 104, 105, 106, 107, and 108, and of the superplastic material plates 201 and 202 are not limited by the above-described Embodiments.

As described above, the pulp molding die of the present invention comprises a plate having a plurality of minute through holes and requires no screen for molding of pulp products. Therefore, according to the present invention, it is possible to provide a lightweight pulp molding die which simplifies maintenance itself, requires no screen attachment work by a skilled worker, has a good durability, requires only a lower production cost, and supplies molding pulp products in a short period of time.

In a conventional type of a pulp molding die having a screen, fibers of raw material are often deposited and remained between the die body and the screen while molding and dewatering. Since such deposited and remained fibers of raw material may exert a bad influence, e.g., unexpected formation of holes, to the quality of the molding pulp products, it is necessary to wash the deposited and remained fibers away. Since the pulp molding die of the present invention has a plurality of through holes which are straight and short, and no screen, there is scarcely such a deposition of fibers of raw material while molding and dewatering.

Furthermore, a print of the screen or prints of connected portion of the combined metal castings for a pulp molding die, which were nearly formed in a conventional technique, is not formed on the surface of the molding pulp products according to the present invention because of no screen. Therefore, the present invention which enables manufacture of packing pulp products having a high smoothness and an excellent finished surface condition.

What is claimed is:

1. A method of manufacturing a pulp molding die, comprising:

providing a superplastic material plate having a plurality of preformed through-holes;

closing the plurality of preformed through-holes;

heating the superplastic material plate under a pressurized atmosphere, forming the plate into a desired shape; and opening the plurality of preformed through-holes of the plate, thereby forming the pulp molding die.

2. A method for manufacturing a pulp molding die comprising the steps of:

providing a first superplastic material plate;

forming a plurality of linear through-holes in the first plate, dimensioning said holes to have an approximately constant and uniform diameter that is not more than 2.0 mm, forming the holes in the first plate at a pitch that is not less than 0.05 mm and not more than 2.0 mm such that the first plate has a ratio of opening area of the holes to an apparent area of one of a front surface and a rear surface of the first plate, in the range of not less than 8.8% and not more than 75%, over the front surface to the rear surface of the first plate;

placing the first plate on a forming die having a cavity which has a shape complementary to that of a pulp molding die to be formed;

placing a second superplastic material plate on the first plate to close the linear through-holes of the first plate; and heating the first and second plates to a superplastic heating temperature;

applying a forming pressure on the second superplastic material plate so as to superplastically deform the first and second plates while the first and second plates are kept at the superplastic heating temperature, thereby pressing the first plate on the cavity of the forming die using the second plate to press the first plate into the shape of the pulp molding die.

3. A method for manufacturing a pulp molding die as claimed in claim 2, wherein said forming pressure is applied by a gas blow forming operation utilizing a gas pressure.

4. A method for manufacturing a pulp molding die as claimed in claim 2, wherein the periphery of both the first and second superplastic material plates are fixed to said forming die.

5. A method for manufacturing a pulp molding die as claimed in claim 2, wherein the periphery of the second superplastic material plate is fixed to said forming die.

6. A method for manufacturing a pulp molding die as claimed in claim 3, wherein said forming pressure is applied by utilizing an inert gas.

7. A method for manufacturing a pulp molding die as claimed in claim 2, further comprising the step of reducing pressure in the cavity of the forming die before the step of applying the forming pressure.

8. A method for manufacturing a pulp molding die as claimed in claim 2, further comprising the step of reducing pressure in the cavity of the forming die during the step of applying the forming pressure.

9. A method for manufacturing a pulp molding die as claimed in claim 2, further comprising the step of replacing air by an inert gas in an inside of the cavity of the forming die before the step of applying the forming pressure.

10. A method for manufacturing a pulp molding die as claimed in claim 2, further comprising the step of replacing air by an inert gas in an inside of the cavity of the forming die in the step of applying the forming pressure.

* * * * *